UNITED STATES PATENT OFFICE.

LAUNCELOT W ANDREWS, OF DAVENPORT, IOWA.

METHOD FOR THE MANUFACTURE OF OXALATES.

1,065,577.   Specification of Letters Patent.   Patented June 24, 1913.

No Drawing.   Application filed August 10, 1910.   Serial No. 576,595.

*To all whom it may concern:*

Be it known that I, LAUNCELOT W. ANDREWS, a citizen of the United States, residing at Davenport, in the county of Scott and State of Iowa, have invented certain new and useful Improvements in Methods for the Manufacture of Oxalates, of which the following is a specification.

This invention relates to an improved process or method for the manufacture of oxalates and oxalic acid.

In the usual method of producing oxalic acid for commercial purposes, saw dust or other material of like nature, is heated on pans with water and caustic alkali and the reaction completed by spreading the mixture on heated plates or pans to which the air is freely admitted. This method possesses many disadvantages and the object of the present invention is the provision of an improved method which will obviate the disadvantages of the old method and will result in the production of a superior and purer product.

In carrying out the present invention air is excluded during the reaction and a more regular distribution of the high temperature required by the reaction is obtained and in addition the presence of a sufficient supply of the water demanded by the reaction is assured at all stages of the generating process by the introduction of such water in it in the form of superheated steam.

In carrying out the present process a hollow drum is employed which is conveniently provided with a plurality of stirring arms on its interior, which may be conveniently extended from a revolving axle extending through the drum. Into a drum of this character is introduced saw dust or other material containing compounds belonging to the class of carbohydrates, and caustic soda, for example, 500 lbs. of saw dust and 1000 lbs. of powdered caustic soda. The stirrer is actuated to thoroughly mix the charge which has been introduced into the drum and a current of steam superheated to 135° C., more or less, and under any low pressure, preferably atmospheric, is introduced into the drum. The charge will rapidly heat to the temperature of the steam which is introduced into the drum, owing in part to the condensation of the steam and its absorption by the solid caustic alkali. The temperature of the steam as admitted to the drum is gradually raised until it is finally brought to 240° C. or even higher and this process is continued until an examination of a sample taken from the vessel shows that the reaction has been completed, which in most instances, will be in considerably less than eight hours from the starting of the process.

As, when the process is being carried out, the drum is completely filled with superheated steam, it will be seen that air is excluded from the reaction mixture during the reactive period, so that all of the advantages of the vacuum process are obtained and the process may be at the same time much more economically practised. Furthermore, by surrounding the mixture with an atmosphere of superheated steam, a more regular distribution of the high temperature required by the reaction is obtained.

The crude product obtained as a result of the present process contains at least one-third of its weight of oxalic acid and is of excellent color and furnishes liquors and calcium oxalate which are of a very pure character. From the product obtained by the above described process, oxalic acid may be obtained by any of the processes known in the art.

I claim:—

1. The method of heating the re-action mixture in the manufacture of oxalic acid by the action of an alkali on carbohydrates consisting in placing it in an atmosphere of superheated steam at substantially atmospheric pressure.

2. The method of producing oxalates consisting in mixing caustic alkali with a material of the carbohydrate class and placing the mixture in an atmosphere of superheated steam under low pressure.

3. The method of producing oxalates consisting in introducing a mixture of alkali and saw dust in a closed vessel, stirring the mixture and filling the vessel with superheated steam under low pressure.

4. The method of producing oxalates consisting in introducing saw dust and alkali into a closed vessel, introducing superheated steam under low pressure into said vessel and continually and gradually increasing the temperature of said steam.

5. The method of producing oxalates consisting in introducing a mixture of alkali and sawdust in a vessel, introducing superheated steam under low pressure into said vessel, and simultaneously applying heat to the exterior of the vessel.

In testimony whereof I affix my signature in presence of two witnesses.

LAUNCELOT W. ANDREWS.

Witnesses:
SOPHIA W. OLMSTED,
JOHN C. OLMSTED.